United States Patent
Hidaka et al.

(10) Patent No.: US 10,154,573 B2
(45) Date of Patent: Dec. 11, 2018

(54) LUMINAIRE GROUPING METHOD, CONTROLLER, AND LIGHTING SYSTEM

(71) Applicant: PANASONIC INTELLECTUAL PROPERTY MANAGEMENT CO., LTD., Osaka (JP)

(72) Inventors: Yuto Hidaka, Osaka (JP); Hiroshi Sugawara, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/717,791

(22) Filed: Sep. 27, 2017

(65) Prior Publication Data

US 2018/0092193 A1    Mar. 29, 2018

(30) Foreign Application Priority Data

Sep. 29, 2016    (JP) ................. 2016-192295

(51) Int. Cl.
| | |
|---|---|
| H05B 37/02 | (2006.01) |
| G06F 3/0482 | (2013.01) |
| G06F 3/0484 | (2013.01) |
| H05B 33/08 | (2006.01) |

(52) U.S. Cl.
CPC ....... H05B 37/0272 (2013.01); G06F 3/0482 (2013.01); G06F 3/04842 (2013.01); H05B 33/0845 (2013.01)

(58) Field of Classification Search
CPC ........... H05B 37/0272; H05B 33/0845; G06F 3/0482; G06F 3/04842

USPC ........................................................ 315/131
See application file for complete search history.

(56) References Cited

U.S. PATENT DOCUMENTS

| | | | |
|---|---|---|---|
| 2004/0160199 A1* | 8/2004 | Morgan ................. | A01M 1/04 315/312 |
| 2006/0028212 A1 | 2/2006 | Steiner et al. | |
| 2011/0101869 A1* | 5/2011 | Pope ..................... | G08C 17/02 315/132 |

(Continued)

FOREIGN PATENT DOCUMENTS

| | | |
|---|---|---|
| JP | 2008-509478 A | 3/2008 |
| JP | 2009-295399 A | 12/2009 |

(Continued)

*Primary Examiner* — Daniel D Chang
(74) *Attorney, Agent, or Firm* — McDermott Will & Emery LLP (57) ABSTRACT

Provided is a lighting system which includes: luminaires; a controller which manages the luminaires; and interfaces which relay communication between the luminaires and the controller, and groups the luminaires into groups. The interface has one or more ports to each of which corresponding one or more of the luminaires are connected. The controller receives a selection of one of a first option for grouping, into a group, one or more sets of luminaires connected respectively to one or more interfaces included in the interfaces or a second option for grouping, into a group, one or more sets of luminaires connected respectively to one or more ports included in the plurality of ports of the interfaces. The controller determines that the grouping is performed according to the one of the first and second options selected in the receiving; and displays information indicating a result of the grouping on a display.

10 Claims, 11 Drawing Sheets

(56) References Cited

U.S. PATENT DOCUMENTS

2013/0293112 A1\* 11/2013 Reed .................. H05B 33/0863
                                                      315/131

FOREIGN PATENT DOCUMENTS

| JP | 2012-015076 A | 1/2012 |
| JP | 2012-199011 A | 10/2012 |
| JP | 2012-221627 A | 11/2012 |
| JP | 2014-170756 A | 9/2014 |
| JP | 2015-065177 A | 4/2015 |
| JP | 2016-062850 A | 4/2016 |

\* cited by examiner

| PROCESS | OPERATION OR STATE |
|---|---|
| S1 | READ ADDRESSES OF LUMINAIRES |
| S2 | DISPLAY ADDRESSES OF LUMINAIRES ON OPERATION TERMINAL |
| S3A | RECEIVE INPUT OF GENEALOGY-SPECIFIED ARRANGEMENT AND DISPLAY DIALOG BOX FOR GENEALOGY-SPECIFIED ARRANGEMENT |
| S4A | RECEIVE SELECTED SPECIFICATION OPTIONS FOR TARGET SETS OF LUMINAIRES |
| S5A | PERFORM GROUPING ACCORDING TO SELECTION RECEIVED IN S4A |

LUMINAIRE GROUPING METHOD, CONTROLLER, AND LIGHTING SYSTEM

CROSS REFERENCE TO RELATED APPLICATION

This application claims the benefit of priority of Japanese Patent Application Number 2016-192295 filed on Sep. 29, 2016, the entire content of which is hereby incorporated by reference.

BACKGROUND

1. Technical Field

The present disclosure relates to a luminaire grouping method for grouping a plurality of luminaires into groups, a controller, and a lighting system.

2. Description of the Related Art

Conventionally, lighting systems each including a plurality of luminaires and a controller which manages the plurality of luminaires have been known. When performing dimming control or schedule control of the plurality of luminaires on a per group basis in the lighting system, there is a need to group the plurality of luminaires into groups in advance.

As an example of a luminaire grouping method, PTL 1 (Japanese Unexamined Patent Application Publication No. 2009-295399) discloses a method for selecting target luminaires to be grouped into groups using a touch panel of a controller, and grouping the target luminaires by inputting the group numbers etc. of the respective groups.

SUMMARY

However, for example, the method for selecting and grouping the luminaires requires much effort for inputting information necessary for the grouping when the number of luminaires is large.

For this reason, the present disclosure provides a luminaire grouping method etc. which enables easy grouping of the plurality of luminaires.

A luminaire grouping method according to an aspect of the present disclosure is a luminaire grouping method for grouping a plurality of luminaires in a lighting system into groups, the lighting system including the plurality of luminaires, a controller which manages the plurality of luminaires, and a plurality of interfaces which are connected to the controller and relay communication between the plurality of luminaires and the controller, wherein each of the plurality of interfaces has one or more ports, and one or more luminaires included in the plurality of luminaires are connected to each of the one or more ports, the luminaire grouping method including: displaying, by the controller, an operation image for grouping the plurality of luminaires into the groups; receiving, by the controller, a selection of one of a first option for grouping, into a group, one or more sets of luminaires connected respectively to one or more interfaces included in the plurality of interfaces or a second option for grouping, into a group, one or more sets of luminaires connected respectively to one or more ports included in the one or more ports of the plurality of interfaces; determining, by the controller, that the grouping is performed according to the one of the first and second options selected in the receiving; and displaying, by the controller, information indicating a result of the grouping on a display.

A controller according to an aspect of the present disclosure is a controller which manages, for each of one or more ports of each of a plurality of interfaces, one or more luminaires connected to the port, the management being performed through each of the plurality of interfaces, the controller including: a display input portion which displays an operation image for grouping a plurality of luminaires including the one or more luminaires into the groups, wherein the controller performs: receiving a selection of one of a first option for grouping, into a group, one or more sets of luminaires connected respectively to one or more interfaces included in the plurality of interfaces or a second option for grouping, into a group, one or more sets of luminaires connected respectively to one or more ports included in a plurality of ports managed by the controller; determining that the grouping is performed according to the one of the options selected in the receiving; and displaying information indicating a result of the grouping on the display input portion.

A lighting system according to an aspect of the present disclosure is a lighting system including: a plurality of luminaires; a controller which manages the plurality of luminaires; and a plurality of interfaces which are connected to the controller and relay communication between the plurality of luminaires and the controller, wherein each of the plurality of interfaces has one or more ports, and one or more luminaires included in the plurality of luminaires are connected to each of the one or more ports, and the controller: displays an operation image for grouping the plurality of luminaires into groups; receives a selection of one of a first option for grouping, into a group, one or more sets of luminaires connected respectively to one or more interfaces included in the plurality of interfaces or a second option for grouping, into a group, one or more sets of luminaires connected respectively to one or more ports included in a plurality of ports; determines that the grouping is performed according to the one of the options selected in the receiving; and displaying, on a display, information indicating a result of the grouping.

In this way, it is possible to easily group the plurality of luminaires into the groups.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, luminaire grouping methods etc. according to an embodiment are described with reference to the drawings. It is to be noted that each of an embodiment and variations described below indicates a specific example of the present disclosure. Accordingly, the numerical values, shapes, materials, constituent elements, the arrangement and connection of the constituent elements, indicated in the following exemplary embodiments are mere examples, and therefore do not limit the scope of the present disclosure. Therefore, among the constituent elements in the following exemplary embodiments, constituent elements not recited in any one of the independent claims which defines the most generic concept of the present disclosure are described as arbitrary constituent elements.

Each of the drawings is a schematic diagram, and thus is not always illustrated precisely. In addition, in each diagram, substantially the same constituent elements are assigned with the same reference numerals, and overlapping descriptions are omitted or simplified.

[1-1. Overall Configuration of Lighting System]

Figure 1:
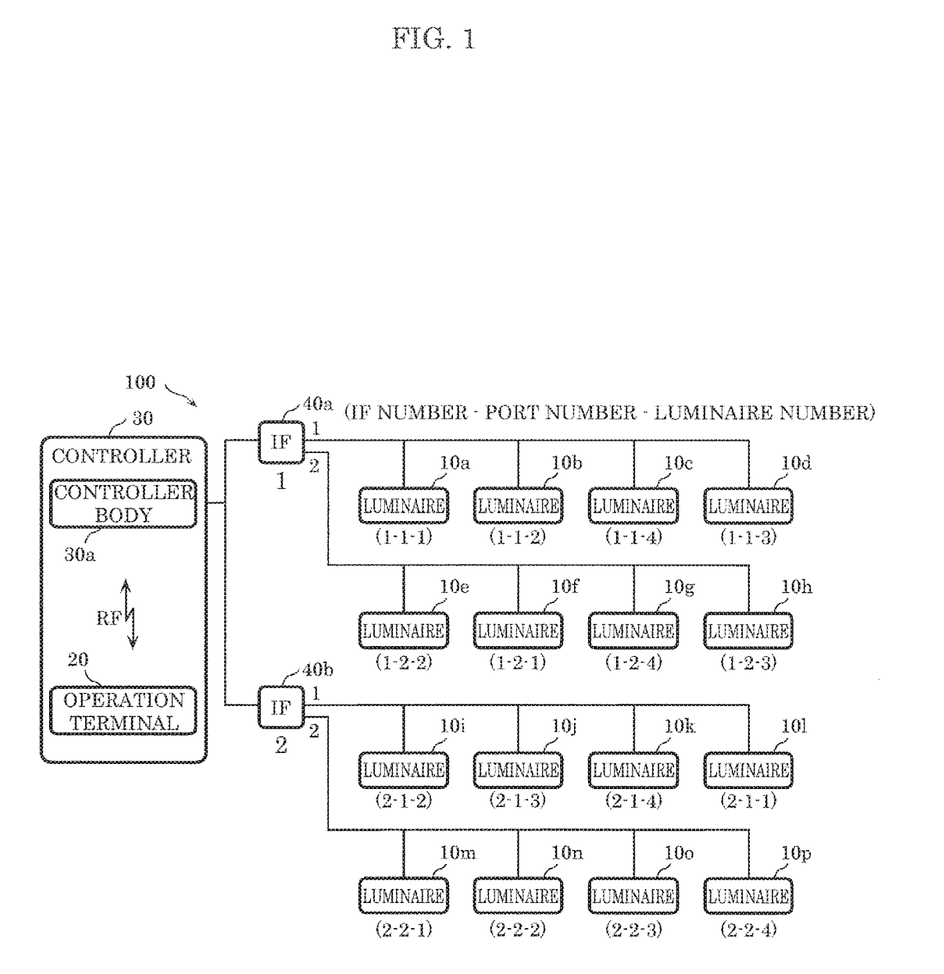
FIG. 1 is a schematic diagram illustrating a controller, interfaces, and luminaires included in a lighting system according to an embodiment.

FIG. 1 is a schematic diagram illustrating lighting system 100 according to an embodiment.

Lighting system 100 includes a plurality of luminaires 10a, 10b, 10c, 10d, 10e, 10f, 10g, 10h, 10i, 10j, 10k, 10l, 10m, 10n, 10o, 10p (hereinafter, which may be referred to as luminaires 10). Lighting system 100 further includes: controller 30 which manages the plurality of luminaires 10; a plurality of interfaces (IF) 40a and 40b which relay communication between the plurality of luminaires 10 and controller 30.

In lighting system 100, each of the plurality of luminaires 10 is connected to controller 30 in a wired manner through a predetermined one of IFs 40. For example, in FIG. 1, two interfaces IF 40a and IF 40b are connected to controller 30 using a bus. Each of IF 40a and IF 40b has two ports (connection ports). IF 40a has port 1 to which four luminaires 10a to 10d are connected using the bus, and port 2 to which four luminaires 10e to 10h are connected using the bus. IF 40b has port 1 to which four luminaires 10i to 10l are connected using the bus, and port 2 to which four luminaires 10m to 10p are connected using the bus.

It is to be noted that, although sixteen luminaires 10a to 10p are illustrated in FIG. 1, fifty or more luminaires 10 may be arranged on a ceiling etc. of a building in reality. The number of IFs 40 connected to controller 30 is not limited to two and may be three. The number of ports of each IF 40 is not limited to two and may be three. The number of luminaires 10 connected to each port may be one, or two or more.

Hereinafter, each of controller 30, interface 40, and luminaires 10 in lighting system 100 is described.

[1-2. Controller]

Figure 2:
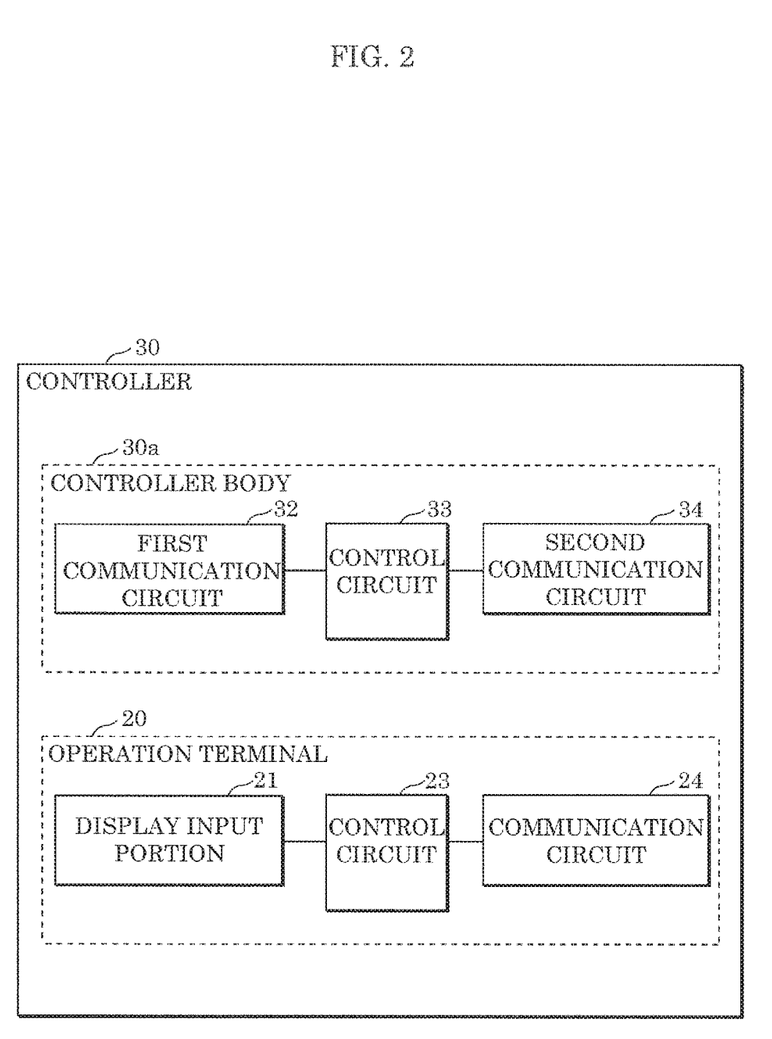
FIG. 2 is a block diagram illustrating a control configuration of the controller according to the embodiment.

FIG. 2 is a block diagram illustrating a control configuration of controller 30. Controller 30 is a setter for grouping the plurality of luminaires 10 into groups.

Controller 30 includes controller body 30a and operation terminal 20. Operation terminal 20 is capable of performing communication with controller body 30a using radio RF. As a communication method using radio RF, one of specified low power radio using a frequency band of 920 MHz or 2.4 GHz, and a method such as WiFi (registered trademark) is used.

Operation terminal 20 is, for example, a mobile tablet terminal or a smartphone. Operation terminal 20 includes display input section (display screen) 21, communication circuit 24, and control circuit 23.

Figure 3:
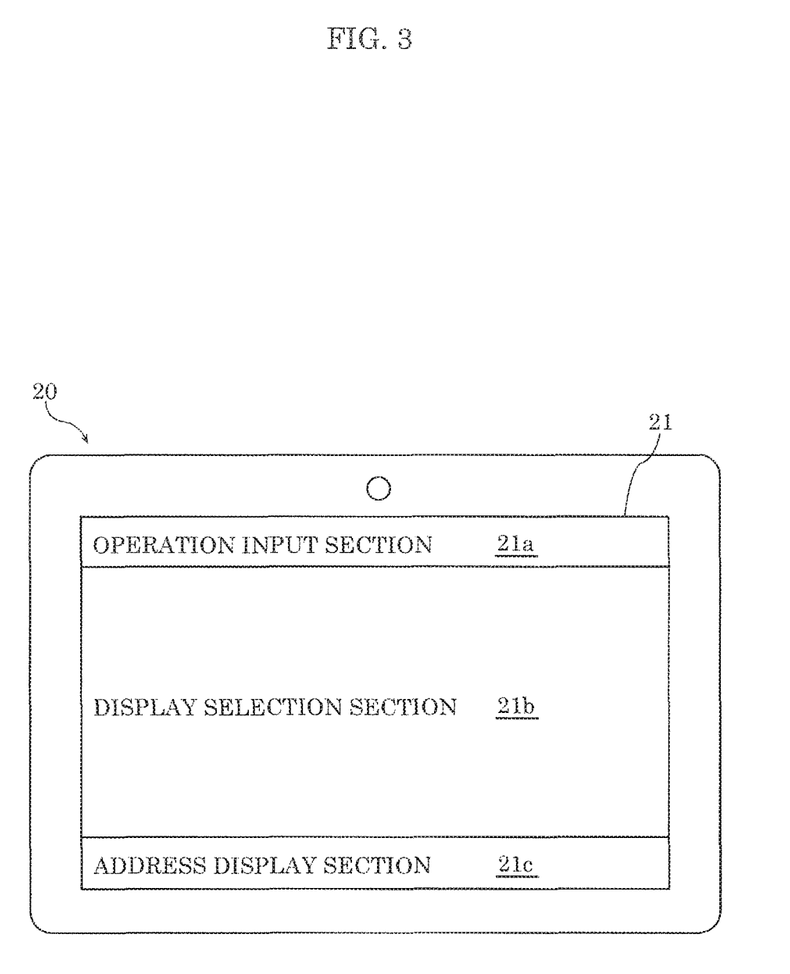
FIG. 3 is a schematic diagram illustrating an operation terminal of the controller according to the embodiment.

FIG. 3 is a schematic diagram illustrating operation terminal 20. Display input section 21 displays an operation image for grouping the plurality of luminaires 10 into groups. Display input section 21 is, for example, a touch panel display, and includes operation input section 21a, display selection section 21b, and address display section 21c.

An icon for starting reading of the addresses of luminaires 10, icons for starting to group luminaires 10 into the groups are displayed in operation input section 21a. Options for grouping luminaires 10 into the groups are displayed in display selection section 21b. The read addresses of luminaires 10 or the addresses of luminaires 10 grouped into the groups are displayed in address display section 21c.

Control circuit 23 of operation terminal 20 is configured with a central processing unit (CPU), and a random access memory (RAM), a read only memory (ROM), or the like, and controls display input section 21 and communication circuit 24. Communication circuit 24 is configured with an antenna and a wireless module, and is capable of communicating first communication circuit 32 of controller body 30a using radio RF.

Upon receiving a predetermined operation from a user through operation terminal 20, controller body 30a proceeds to each of processes (illustrated in FIG. 6B or FIG. 8B) necessary for the grouping.

Controller body 30a includes first communication circuit 32, control circuit 33, and second communication circuit 34. Control circuit 33 of controller body 30a is configured with a CPU, and a RAM, a ROM, or the like, and controls turn-on of luminaires 10. In this embodiment, control circuit 33 sets the address of IF 40 connected to controller 30, and groups luminaires 10 into groups. First communication circuit 32 communicates with operation terminal 20 using radio RF, and second communication circuit 34 communicates with IF 40 in a wired manner.

Immediately after the plurality of luminaires 10 are arranged in a building, controller body 30a has not yet stored information regarding the address of each luminaire 10. Controller body 30a reads the address of each luminaire 10 stored in IF 40 from IF 40 when grouping the plurality of luminaires 10 into groups. Through this reading of the address, controller body 30a stores identification information of each luminaire 10, port information for identifying the port to which each luminaire 10 is connected, and interface information for identifying IF 40 to which each luminaire 10 is connected. Controller 30 makes options for grouping the plurality of luminaires 10 into the groups, based on the identification information, the port information, and the interface information.

It is to be noted that controller body 30a and operation terminal 20 do not always need to be separate bodies, and may be an integrated body. In other words, controller body 30a may have display input section (display screen) 21, and necessary information may be displayed or input in display input section 21.

[1-3. Interface]

Figure 4:
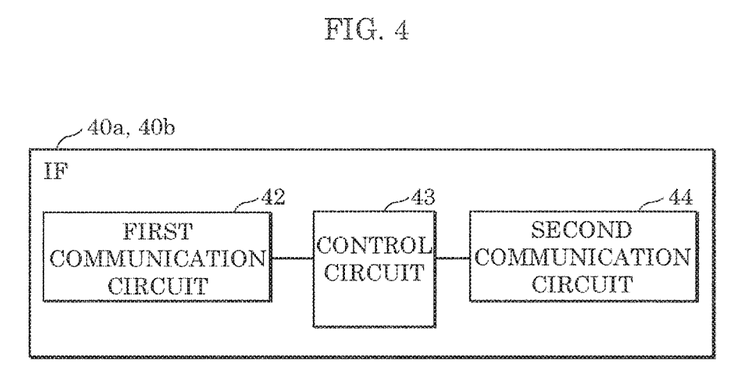
FIG. 4 is a block diagram illustrating a control configuration of an interface according to the embodiment.

FIG. 4 is a block diagram illustrating a control configuration on interface (IF) 40.

IF 40 includes first communication circuit 42, control circuit 43, and second communication circuit 44. First communication circuit 42 is connected to second communication circuit 34 of controller body 30a, and second communication circuit 44 is connected to predetermined ones of luminaires 10 through a plurality of ports.

Control circuit 43 of IF 40 is configured with a CPU, and a RAM, a ROM, or the like. Control circuit 43 converts packet communication signals received from controller 30 to digital signals which can be processed inside luminaires 10, and transmits the digital signals to luminaires 10 connected to IF 40 through second communication circuit 44. In addition, control circuit 43 converts the digital signals received from luminaires 10 connected to IF 40 into digital signals which can be processed in controller 30, and transmits the digital signals to controller 30 through first communication circuit 42.

In this embodiment, control circuit 43 of IF 40 sets an address to each of luminaires 10 connected to IF 40. In addition, control circuit 43 stores the addresses of controller 30 and control circuit 43 itself and the address of each target luminaire 10 in association with a corresponding one of the ports.

[1-4. Luminaire]

Each of the plurality of luminaires 10 is, for example, a light emitting diode (LED), and is arranged on a part (such as a ceiling) of a building.

Figure 5:
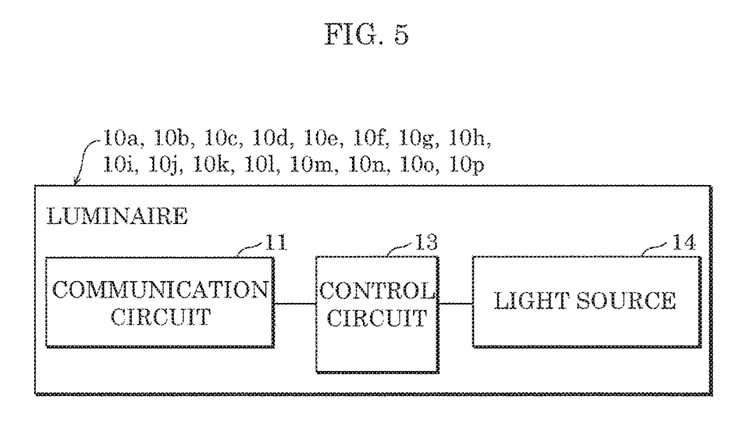
FIG. 5 is a block diagram illustrating a control configuration of the luminaires according to the embodiment.

FIG. 5 is a block diagram illustrating a control configuration of each of the plurality of luminaires 10. Each of luminaires 10 includes light source 14, control circuit 13, and communication circuit 11.

Communication circuit 11 is connected to second communication circuit 34 of IF 40, and conveys an operation command from controller 30 to control circuit 13. Control circuit 13 is configured with a CPU, and a RAM, a ROM, or the like, and controls turn-on of light source 14 based on the operation command from controller 30. Light source 14 includes a plurality of light-emitting diodes each emits white, red, green, or blue light, and is subjected to dimming control, toning control, or schedule control by control circuit 13.

Each of luminaires 10 is assigned with an address from IF 40 before the grouping of luminaires 10 is performed. Control circuit 13 of luminaire 10 stores the assigned address of luminaire 10 itself. For example, a unique device identifier (UDID) is used as the address. FIG. 1 illustrates an example in which simple addresses 1 to 4 (luminaire numbers) are assigned to respective luminaires 10.

[1-5. Luminaire Grouping Method]

Next, a method for grouping luminaires 10 is described.

Figure 6A:
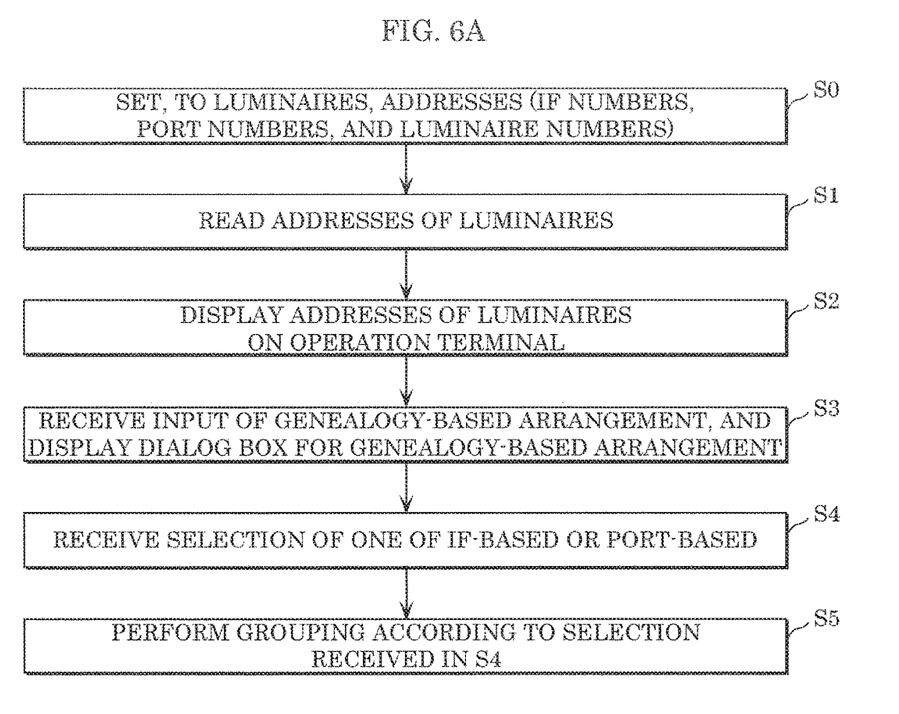
FIG. 6A is a flowchart illustrating an example of a luminaire grouping method according to the embodiment.
Figure 6B:
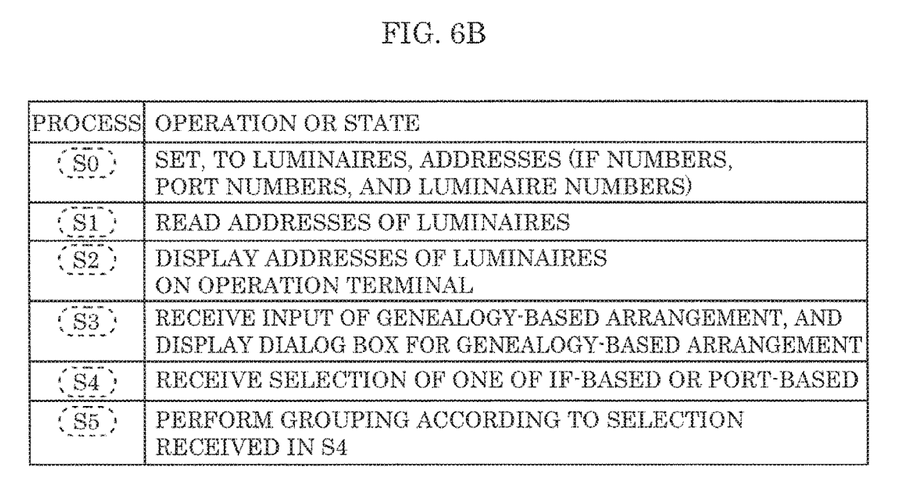
FIG. 6B is a process table illustrating an example of the luminaire grouping method according to the embodiment.

FIG. 6A is a flowchart illustrating an example of the method for grouping luminaires 10. FIG. 6B is a process table illustrating the example of the method for grouping luminaires 10. Each of FIGS. 7A to 7E is a diagram illustrating an image which is displayed on operation terminal 20 of controller 30.

First, addresses are set to luminaires 10 (S0).

More specifically, controller 30 which has received an operation for setting the addresses from a user assigns address parts (IF numbers) to respective IFs 40. In addition, each IF 40 which has received an instruction for setting the addresses from controller 30 assigns address parts (luminaire numbers) to luminaires 10 connected to IF 40. Addresses assigned here are each composed of random numbers or symbols which do not overlap with the other addresses for the other luminaires connected to the same port. The addresses assigned to luminaires 10 are each stored in a corresponding one of IFs 40 to which luminaire 10 is connected, in association with a corresponding one of the ports of IF 40. For example, the addresses of luminaires 10a to 10d are stored in corresponding IF 40a in association with port 1 of corresponding IF 40a.

Figure 7A:
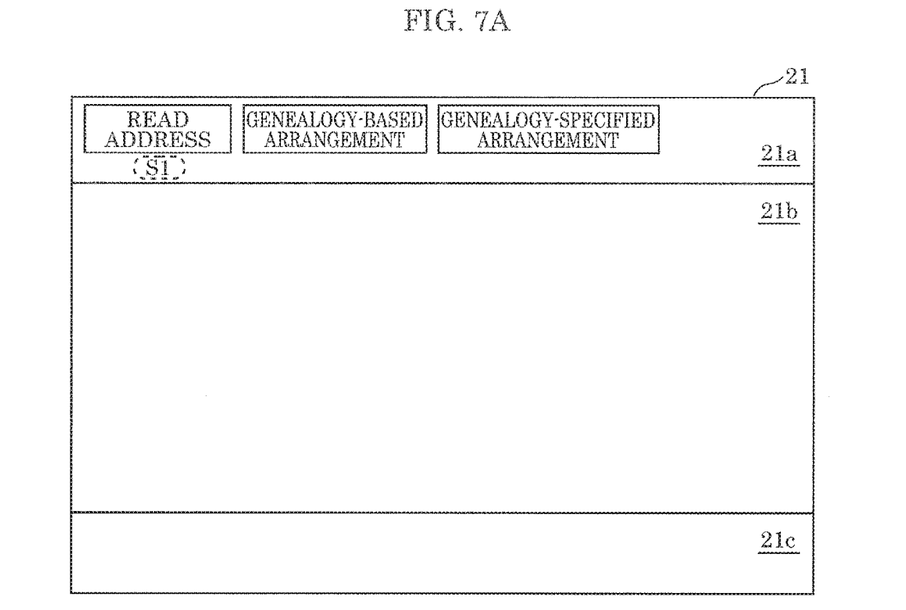
FIG. 7A is a diagram illustrating an image displayed on the operation terminal of the controller according to the embodiment.

When the addresses are set to luminaires 10, as illustrated in FIG. 7A, icons of "READ ADDRESSES", "GENEALOGY-BASED ARRANGEMENT", and "GENEALOGY-SPECIFIED ARRANGEMENT" are displayed in operation input section 21a of operation terminal 20.

Next, controller 30 reads the addresses of luminaires 10 (S1).

More specifically, controller 30 receives, from the user, an input of "ADDRESS READING" displayed in operation input section 21a, and reads the addresses of respective luminaires 10. When reading the addresses, controller 30 makes an inquiry for the addresses of luminaires 10 to each IF 40. Since each IF 40 stores the addresses of luminaires 10 each connected to a corresponding one of the ports of IF 40, controller 30 obtains the addresses (IF numbers, port numbers, and luminaire numbers) of luminaires 10 through the inquiry.

Figure 7B:
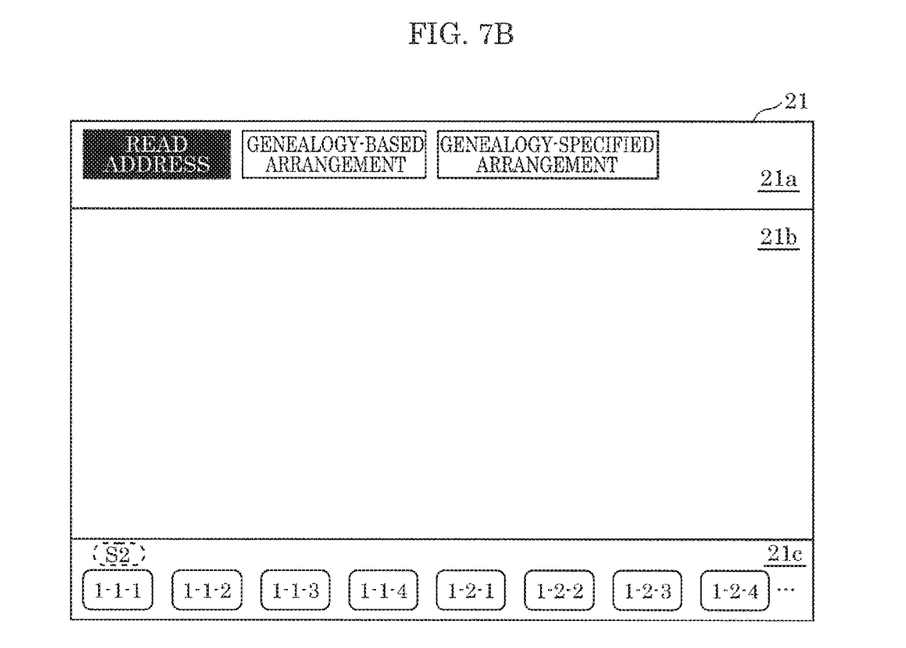
FIG. 7B is a diagram illustrating an image displayed on the operation terminal next to the image in FIG. 7A.

Upon obtaining the addresses, controller 30 displays addresses of luminaires 10 in address display section 21c as illustrated in FIG. 7B (S2).

The addresses of luminaires 10 are displayed side by side in a horizontal row as illustrated in FIG. 7B. It is to be noted that the display style is a non-limiting example. The addresses of luminaires 10 may be displayed in a listed manner using a table, or using a tree chart as illustrated in FIG. 1.

The reading of the addresses allows controller 30 to obtain and display the IF number, the port number, and the luminaire number of each of luminaires 10. The obtainment of the information allows controller 30 to group luminaires 10 into groups after the obtainment.

Methods for grouping luminaires 10 include a grouping method based on the genealogy-based arrangement, and a grouping method based on the genealogy-specified arrangement. First, the grouping method based on the genealogy-based arrangement is described.

Figure 7C:
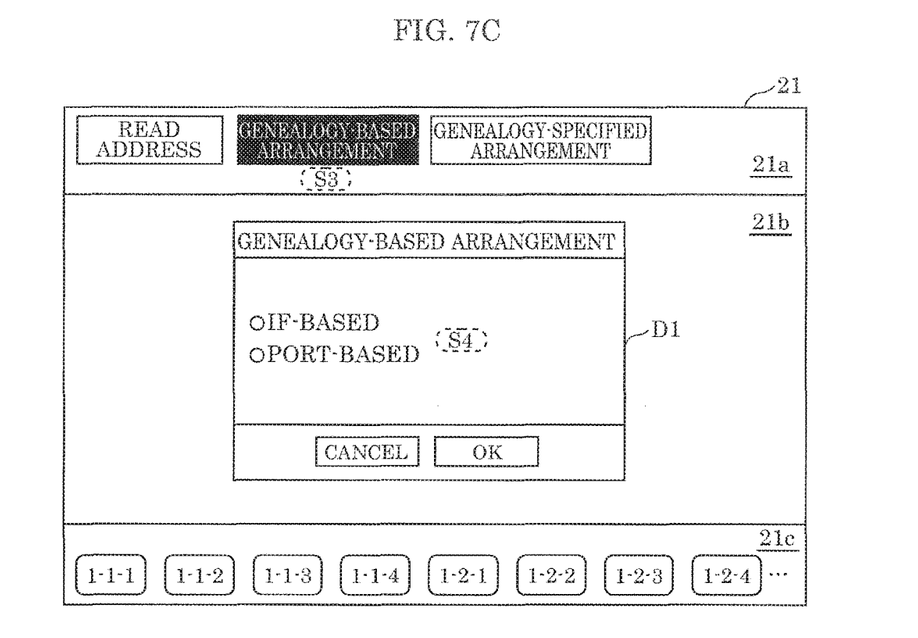
FIG. 7C is a diagram illustrating an image displayed on the operation terminal next to the image in FIG. 7B.

Upon receiving, from the user, an input of "GENEALOGY-BASED ARRANGEMENT" displayed in operation input section 21a, controller 30 displays dialog box D1 in display selection section 21b as illustrated in FIG. 7C. At the same time, controller 30 displays, in dialog box D1, both genealogy-based options which are an "IF-based" option and a "port-based" option (S3).

The IF-based option is an option for grouping, into a group, one or more sets of luminaires 10 connected respectively to one or more interfaces 40 included in the plurality of interfaces 40. This option is, in FIG. 1 for example, an option for grouping luminaires 10 into two groups in total one of which corresponds to a set of eight luminaires 10a to 10h connected to IF 40a and the other of which corresponds to a set of eight luminaires 10i to 10p connected to IF 40b.

The port-based option is an option for grouping, into a group, one or more sets of luminaires 10 connected respectively to one or more ports included in the plurality of ports. This option is, in FIG. 1 for example, an option for grouping luminaires 10 into four groups in total a first one of which corresponds to a set of four luminaires 10a to 10d connected to port 1 of IF 40a, a second one of which corresponds to a set of four luminaires 10e to 10h connected to port 2 of IF 40a, a third one of which corresponds to a set of four luminaires 10i to 10l connected to port 1 of IF 40b, and a fourth one of which corresponds to a set of four luminaires 10m to 10p connected to port 2 of IF 40b.

It is to be noted that each of these two options is made based on the following information which has been obtained in advance: the IF information for identifying each of IFs 40 to which corresponding ones of luminaires 10 are connected; the port information for identifying each of ports to which corresponding ones of luminaires 10 are connected; and the identification information of each of luminaires 10. In other words, controller 30 makes the options for each IF and for each port, based on the IF number, the port number, and the luminaire number of each luminaire 10 obtained by controller 30 itself.

Next, controller 30 selects which one of the "IF-BASED" arrangement and the "PORT-BASED" arrangement is used to group luminaires 10 into groups (S4). More specifically, controller 30 receives an input of "OK" in dialog box D1 in a state where the radio button for either "IF-BASED" or "PORT-BASED" is selected. With this input, controller 30 determines that the grouping is performed according to the selected option.

Figure 7D:
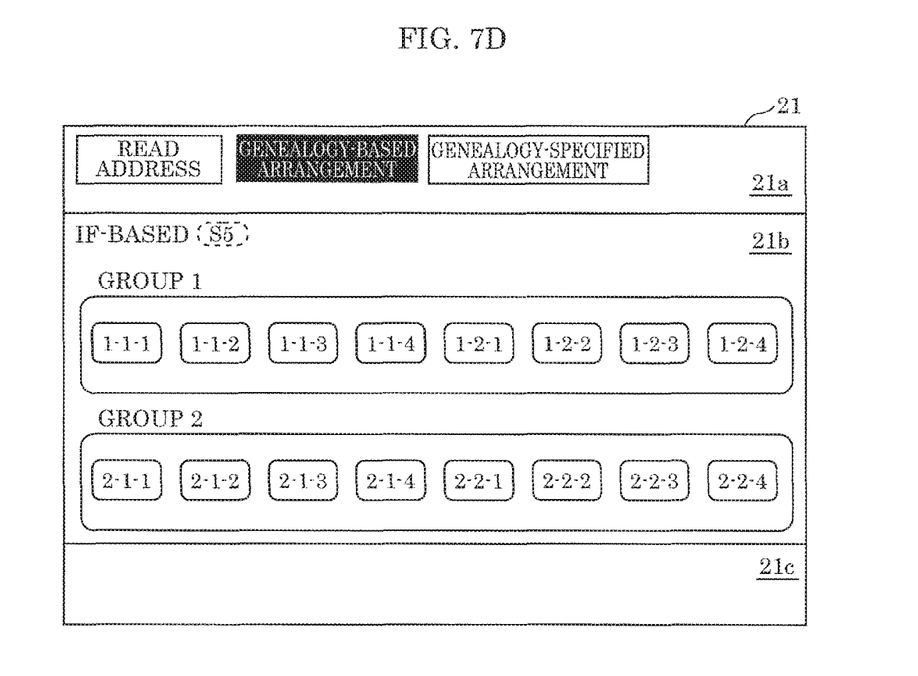
FIG. 7D is a diagram illustrating an image displayed on the operation terminal next to the image in FIG. 7C.
Figure 7E:
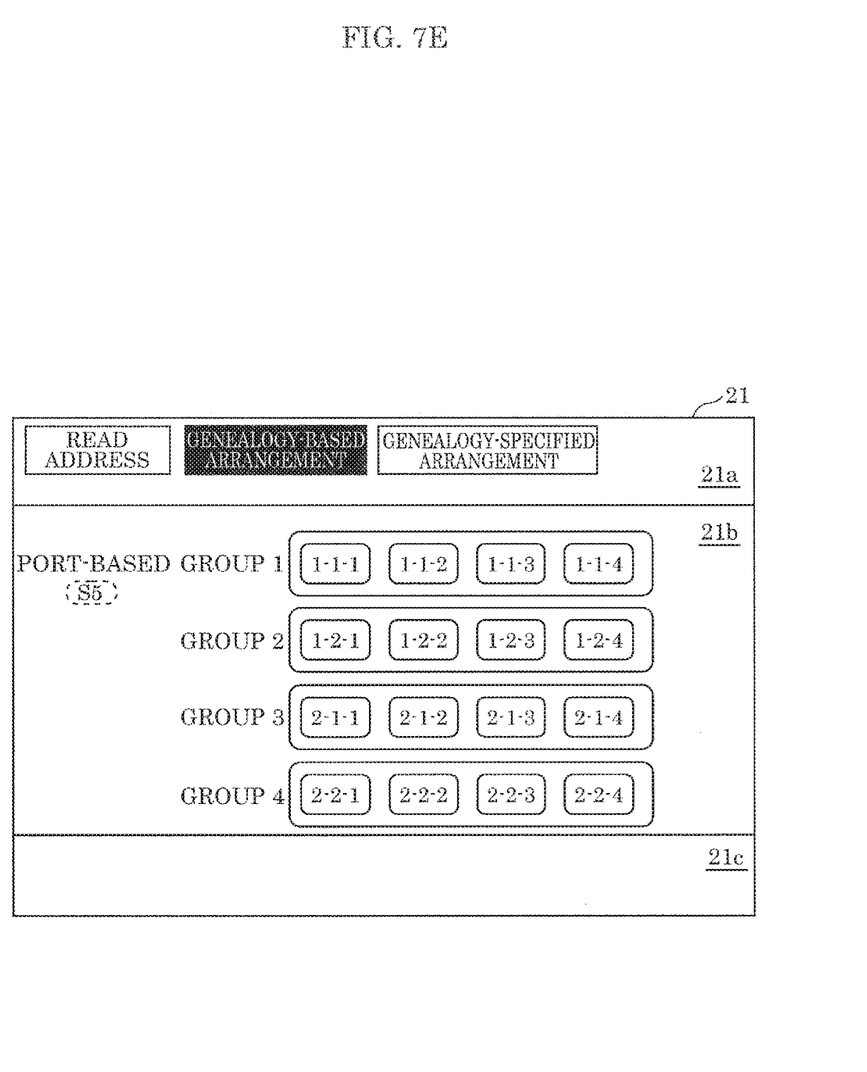
FIG. 7E is a diagram illustrating an image displayed on the operation terminal next to the image in FIG. 7C.

For example, when the option of "IF-BASED" is selected, an image of two groups made for each IF is displayed in display selection section 21b (see S5 of FIG. 7D). In addition, when the option of "PORT-BASED" is selected, an image of four groups made for each port is displayed in display selection section 21b (see S5 of FIG. 7E).

The grouping of luminaires 10 is completed through the respective steps illustrated in FIG. 6A. In addition, the information indicating the result of the grouping is displayed in display input section (display screen) 21 of operation terminal 20.

Although both options of "IF-BASED" and "PORT-BASED") are displayed in Step S3 as illustrated in FIG. 7C, it is to be noted that only one of the options may be displayed and an inquiry about the availability of the option may be made.

Next, a luminaire grouping method based on the genealogy-specified arrangement is described as a method for grouping luminaires 10.

Figure 8A:
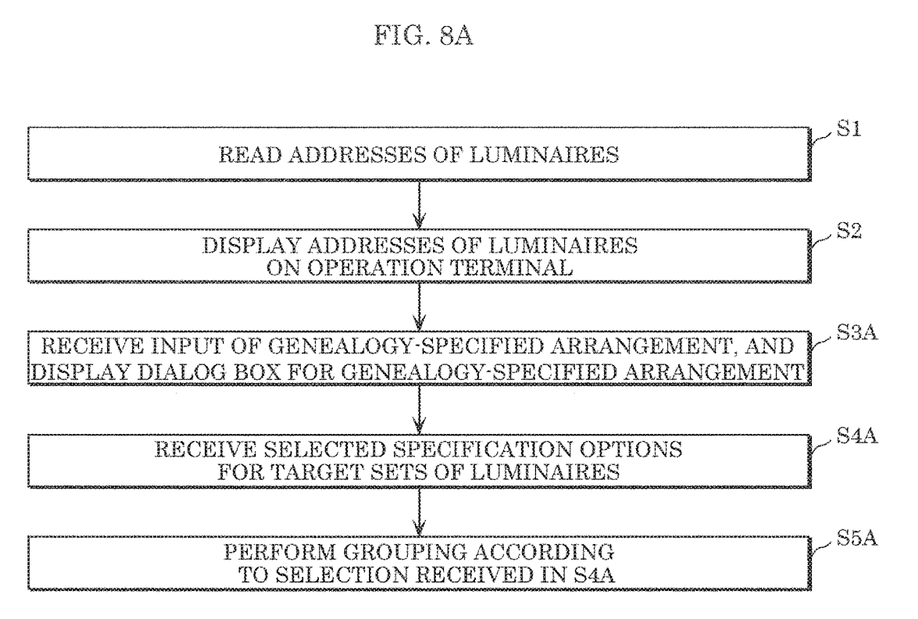
FIG. 8A is a flowchart illustrating an example of a luminaire grouping method according to the embodiment.
Figure 8B:
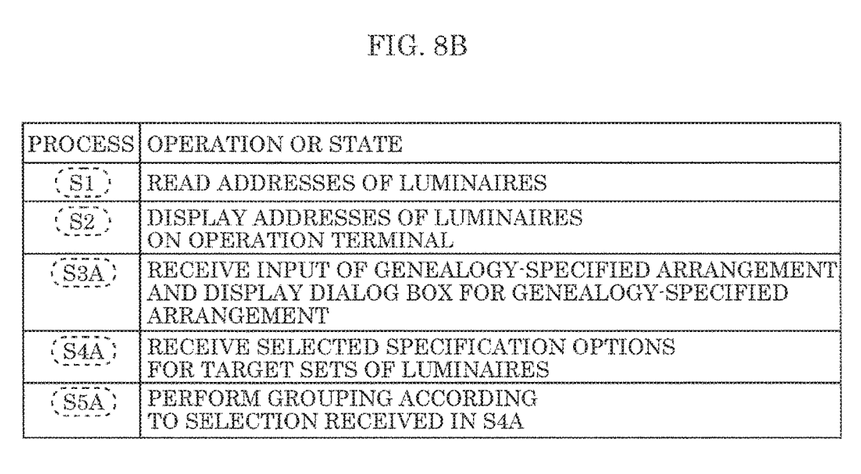
FIG. 8B is a process table illustrating the example of the luminaire grouping method according to the embodiment.

FIG. 8A is a flowchart indicating the method for grouping luminaires 10 based on the genealogy-specified arrangement, and FIG. 8B is a process table indicating the method for grouping luminaires 10 based on the genealogy-specified arrangement. Each of FIGS. 9A to 9C is a diagram illustrating an image which is displayed on operation terminal 20 of controller 30.

Steps S1 and S2 are as described earlier, and the same descriptions are omitted.

Figure 9A:
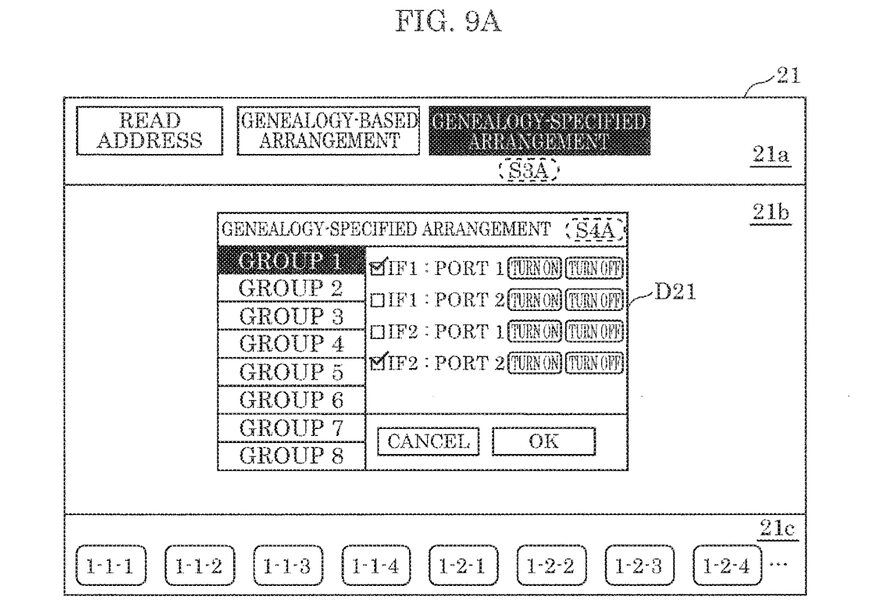
FIG. 9A is a diagram illustrating an image displayed on the operation terminal next to the image in FIG. 7B.
Figure 9B:
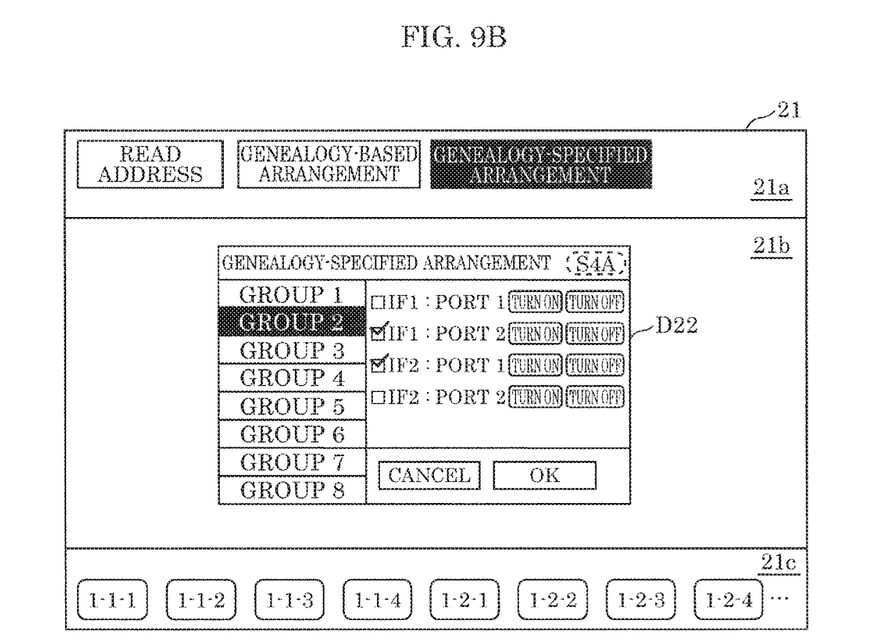
FIG. 9B is a diagram illustrating an image displayed on the operation terminal next to the image in FIG. 9A.
Figure 9C:
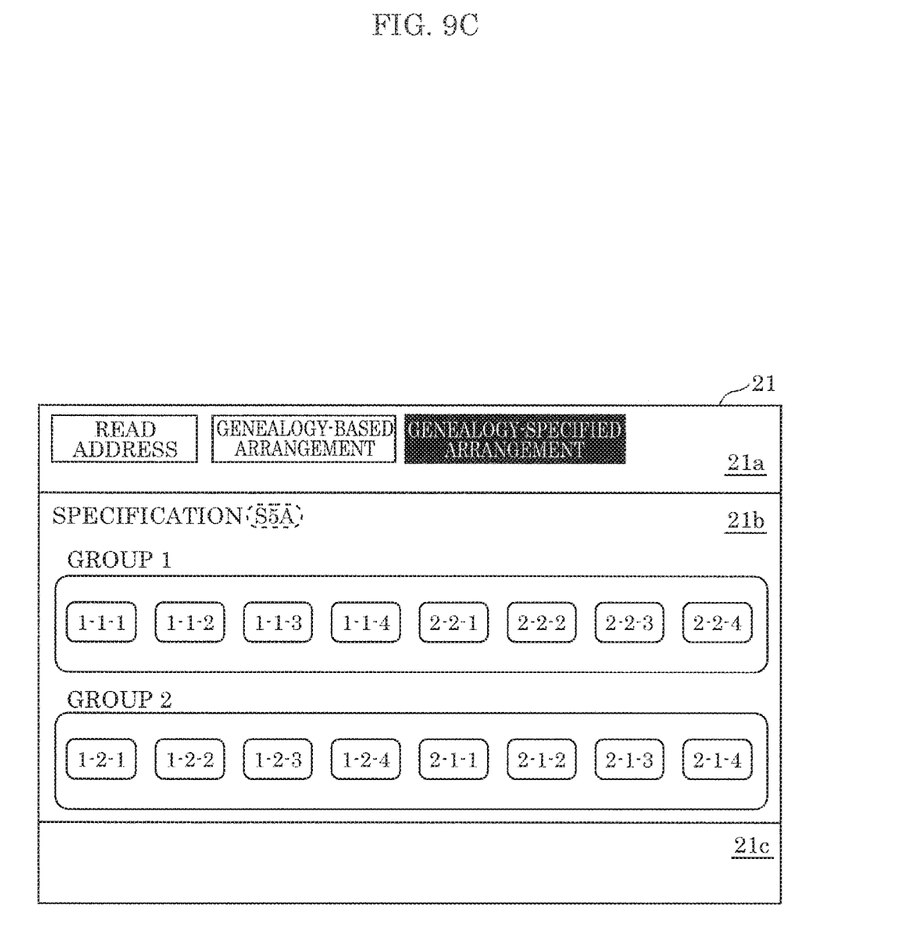
FIG. 9C is a diagram illustrating an image displayed on the operation terminal next to the image in FIG. 9B.

Upon receiving, from the user, an input of "GENEALOGY-SPECIFIED ARRANGEMENT" displayed in operation input section 21a, controller 30 displays dialog box D1 in display selection section 21b as illustrated in FIG. 9A. At the same time, controller 30 displays the group names of groups into which luminaires 10 are to be grouped and a plurality of options which are options for the respective ports of each IF in a listed manner in dialog box D21 (S3A).

The option for each port of each IF (hereinafter referred to as a specification option) is an option for grouping, into a group, one or more sets of luminaires 10 connected respectively to one or more ports included in the plurality of ports. Each specification option has a check box. When the user touches the check box, the specification option is selected.

Controller 30 receives the selected specification options for target sets of luminaires 10 from among the plurality of displayed specification options (S4A). For example, in FIG. 9A, luminaires 10a to 10d connected to port 1 (PORT 1) of IF 40a (IF 1) and luminaires 10m to 10p connected to port 2 (PORT 2) of IF 40b (IF 2) are specified as group 1. Controller 30 receives an input of "OK" in dialog box D21 in a state where these specification options are selected. Through this input, controller 30 receives the selection of the specification options, and determines that grouping of group 1 is performed according to the selected option (S5A).

As illustrated in FIG. 9B, controller 30 displays dialog box D22 in display selection section 21b, and displays, in dialog box D22, group names and a plurality of options which are options for the respective ports of each IF in a listed manner.

Controller 30 receives specification options for target sets of luminaires 10 from among the plurality of displayed specification options (S4A). For example, in FIG. 9B, luminaires 10e to 10h connected to port 2 of IF 40a and luminaires 10i to 10l connected to port 1 of IF 40b are specified as group 2. Controller 30 receives an input of "OK" in dialog box D22 in a state where these specification options are selected. Through this input, controller 30 receives the selection of the specification options, and determines that grouping of group 2 is performed according to the selected option (S5A).

It is to be noted that icons for turning on or off luminaires 10 for each set are arranged in dialog boxes D21 and D22. The user can visually recognize the set of luminaires 10 connected to each port of each IF by pressing the icon for turning on or off luminaires 10.

The grouping of luminaires 10 is completed through the respective steps illustrated in FIG. 8A. In addition, the information indicating the result of the grouping is displayed in display input section (display screen) 21 of operation terminal 20 as illustrated in FIG. 9C.

[1-6. Effects Etc.]

The method for grouping luminaires 10 according to this embodiment is a method for grouping a plurality of luminaires 10 in lighting system 100 into groups. Lighting system 100 includes the plurality of luminaires 10, controller 30 which manages the plurality of luminaires 10, and a plurality of interfaces 40 which are connected to controller 30 and relay communication between the plurality of luminaires 10 and controller 30. Interface 40 has one or more ports to each of which corresponding one or more of the plurality of luminaires 10 are connected. Controller 30 displays an operation image for grouping the plurality of luminaires 10 into the groups; receives a selection of one of a first option for grouping, into a group, one or more sets of luminaires 10 connected respectively to one or more interfaces 40 included in the plurality of interfaces 40 or a second option for grouping, into a group, one or more sets of luminaires 10 connected respectively to one or more ports included in a plurality of ports of the plurality of interfaces; determines that the grouping is performed according to the one of the first and second options selected in the receiving; and displays information indicating a result of the grouping on a display.

In this way, it is possible to reduce the grouping operations by grouping luminaires 10 into groups, for each of luminaire groups connected respectively to interfaces 40 or for each of luminaire groups connected respectively to the ports of each interface 40. In addition, it is possible to group luminaires 10 into the groups in short time.

For example, controller 30 may perform the determining by: displaying both of the first option or the second option; and receiving the selection of the one of the displayed first and second options.

In this way, it is possible to reduce the grouping operations by grouping the plurality of luminaires 10 into the groups, for each of luminaire groups connected respectively to interfaces 40 or for each of luminaire groups connected respectively to the ports of each interface 40, and thus it is possible to group the plurality of luminaires 10 easily.

For example, controller 30 may perform the determining by: treating, for each of the plurality of ports, the one or more luminaires 10 connected to the port as a corresponding one of the sets, displaying a plurality of options for grouping, into the group, a certain number of sets included in the one or more sets; and receiving the selection of an option for selecting the certain number of sets among the displayed plurality of options.

In this way, it is possible to reduce the operations for grouping luminaires 10 connected to each of the ports into the group by grouping the sets into the group, and thus it is possible to group luminaires 10 easily.

For example, the certain number of sets may comprise a plurality of sets, and the plurality of sets may be connected respectively to ports of different ones of the plurality of interfaces 40.

In this case, it is possible to group luminaires 10 connected to different interfaces 40, and thus it is possible to increase the flexibility in the grouping.

For example, before displaying the options, controller 30 may perform the following: obtaining, through each of the plurality of interfaces 40, identification information of each of the one or more luminaires 10 connected to a corresponding one of the one or more ports of interface 40 and port information for identifying the port to which the one or more luminaires 10 are connected; and making the first and second options based on the identification information and the port information which have been obtained and interface information for identifying interface 40 having the port to which the one or more luminaires 10 are connected.

In this case, controller 30 makes the options based on the identification information, the port information, and the interface information of luminaires 10, and can display the clear options for the grouping. Thus, it is possible to group luminaires 10 easily.

Controller 30 according to this embodiment manages, for each of one or more ports of each of a plurality of interfaces 40, one or more luminaires 10 connected to the port. The management is performed through each of the plurality of interfaces. Controller 30 includes: display input portion 21 which displays an operation image for grouping a plurality of luminaires 10 including the one or more luminaires into groups. The controller performs: receiving a selection of one of a first option for grouping, into a group, one or more sets of luminaires 10 connected respectively to one or more interfaces 40 included in the plurality of interfaces 40 or a second option for grouping, into a group, one or more sets of luminaires 10 connected respectively to one or more ports included in a plurality of ports managed by the controller; determining that the grouping is performed according to the one of the options selected in the receiving; and displaying information indicating a result of the grouping on the display input portion.

Controller 30 groups the plurality of luminaires 10 into groups for each interface 40 or for each port of each interface 40, and thereby reduces the grouping operations and can perform the grouping easily. In addition, the use of controller 30 makes it possible to group luminaires 10 in short time.

For example, controller 30 may include controller body 30*a* and operation terminal 20 which communicates with controller body 30*a*. Display input portion 21 may be provided to operation terminal 20.

In this case, it is possible to group the plurality of luminaires 10 into groups easily using display input portion 21 of operation terminal 20. In addition, it is possible to group luminaires 10 at a position apart from controller body 30*a*. For example, controller 30 further controls turning on and off, or brightness of luminaires 10.

Lighting system 100 according to this embodiment includes: the plurality of luminaires 10; controller 30 which manages the plurality of luminaires 10; and the plurality of interfaces 40 which are connected to controller 30 and relay communication between the plurality of luminaires 10 and controller 30. Interface 40 has one or more ports to each of which corresponding one or more of the plurality of luminaires 10 are connected. Controller 30 displays an operation image for grouping the plurality of luminaires 10 into groups; receives a selection of one of a first option for grouping, into a group, one or more sets of luminaires 10 connected respectively to one or more interfaces 40 included in the plurality of interfaces 40 or a second option for grouping, into a group, one or more sets of luminaires 10 connected respectively to one or more ports included in the plurality of ports; determines that the grouping is performed according to the one of the first and second options selected in the receiving; and displays, on a display, information indicating a result of the grouping.

Lighting system 100 groups luminaires 10 for each interface 40 or for each port of each interface 40, and thus can reduce the grouping operations and can perform the grouping easily. In addition, it is possible to grouping luminaires 10 in short time.

(Variations)

The luminaire grouping methods, the controller, and the lighting system have been described based on the embodiment above, the present disclosure is not limited to the above-described embodiment. For example, the present disclosure covers embodiments which can be obtained by adding, to the embodiment, various kinds of modifications that would be arrived at by a person skilled in the art and embodiments which can be realized by arbitrarily combining the constituent elements and functions in the embodiment within the scope of the present disclosure.

Although a certain number of sets of luminaires connected to corresponding ones of the ports of IFs 40 are selected and grouped into a group of luminaires 10 according to the above method for grouping based on the genealogy-specified arrangement, this is a non-limiting example. The number of IFs 40 may be three or more as stated above, and in this case, a certain number of sets of luminaires 10 connected to corresponding ones of IFs 40 may be selected and grouped into a group of luminaires 10. For example, controller 30 may determine that grouping is performed by displaying a plurality of options each of which is for grouping, into a group, one or more sets of luminaires 10 connected respectively to one or more IFs 40 included in a plurality of IFs 40, and receiving a selection of one of the displayed options.

In the grouping method based on the genealogy-specified arrangement, luminaires 10 have been grouped into groups 1 and 2 by selecting two specification options for each of groups 1 and 2. However, grouping is not limited thereto, and it is also good to select a single specification option, and perform grouping based only on the single specification option.

What is claimed is:

1. A luminaire grouping method for grouping a plurality of luminaires in a lighting system into groups, the lighting system including the plurality of luminaires, a controller which manages the plurality of luminaires, and a plurality of interfaces which are connected to the controller and relay communication between the plurality of luminaires and the controller,
wherein each of the plurality of interfaces has one or more ports, and one or more luminaires included in the plurality of luminaires are connected to each of the one or more ports,
the luminaire grouping method comprising:
displaying, by the controller, an operation image for determining that the grouping is performed and grouping the plurality of luminaires into the groups;
receiving, by the controller, a selection of one of a first option for grouping, into a group, one or more sets of luminaires connected respectively to one or more interfaces included in the plurality of interfaces or a second option for grouping, into a group, one or more sets of luminaires connected respectively to one or more ports included in the plurality of ports of the plurality of interfaces;
determining, by the controller, that the grouping is performed according to the one of the first and second options selected in the receiving; and
displaying, by the controller, information indicating a result of the grouping on a display.

2. The luminaire grouping method according to claim 1, wherein the determining is performed by:
displaying both of the first option or the second option; and
receiving the selection of the one of the displayed first or second options.

3. The luminaire grouping method according to claim 1, wherein the determining is performed by:
treating, for each of the plurality of ports, the one or more luminaires connected to the port as a corresponding one of the sets,
displaying a plurality of options for grouping, into the group, a certain number of sets included in the one or more sets connected respectively to the one or more ports; and
receiving the selection of an option for selecting the certain number of sets among the displayed plurality of options.

4. The luminaire grouping method according to claim 3, wherein the certain number of sets comprise a plurality of sets, and the plurality of sets are connected respectively to ports of different ones of the plurality of interfaces.

5. The luminaire grouping method according to claim 2, further comprising the following performed before displaying the options:
obtaining, by the controller, through each of the plurality of interfaces, identification information of each of the one or more luminaires connected to a corresponding one of the one or more ports of the interface and port information for identifying the port to which the one or more luminaires are connected; and
making, by the controller, the first and second options based on the identification information and the port information which have been obtained and interface information for identifying the interface having the port to which the one or more luminaires are connected.

6. A controller which manages, for each of one or more ports of each of a plurality of interfaces, one or more luminaires connected to the port the management being performed through each of the plurality of interfaces, the controller comprising:
a display input portion which displays an operation image for determining that the grouping is performed and grouping a plurality of luminaires including the one or more luminaires into groups; and
a control circuit which determines that the grouping is performed,
wherein the display input portion receives a selection of one of a first option for grouping, into a group, one or more sets of luminaires connected respectively to one or more interfaces included in the plurality of interfaces or a second option for grouping, into a group, one or more sets of luminaires connected respectively to one or more ports included in a plurality of ports managed by the controller, and
the control circuit determines that the grouping is performed according to the one of the options selected in the receiving and causes the display input portion to display information indicating a result of the grouping.

7. The controller according to claim 6,
wherein the controller includes a controller body and an operation terminal which communicates with the controller body, and
the display input portion is provided on the operation terminal.

8. The controller according to claim 6,
wherein the controller further controls turning on and off, or brightness of the luminaires.

9. A lighting system, comprising:
a plurality of luminaires;
a controller which manages the plurality of luminaires; and
a plurality of interfaces which are connected to the controller and relay communication between the plurality of luminaires and the controller,
wherein each of the plurality of interfaces has one or more ports, and one or more luminaires included in the plurality of luminaires are connected to each of the one or more ports,
the controller includes,
a display input portion which displays an operation image for determining that the grouping is performed; and
a control circuit which determines the grouping of the plurality of luminaires,
the display input portion receives a selection of one of a first option for grouping, into a group, one or more sets of luminaires connected respectively to one or more interfaces included in the plurality of interfaces or a second option for grouping, into a group, one or more sets of luminaires connected respectively to one or more ports included in the plurality of ports, and the control circuit determines that the grouping is performed according to the one of the options selected in the receiving, and causing the display input portion to display information indicating a result of the grouping.

10. A method of grouping a plurality of luminaires into groups, comprising:

displaying, by a controller on a display, a configuration of a lighting system, the configuration including information regarding a plurality of luminaires included in the lighting system, information regarding a plurality of interfaces which are connected to the controller and relay communication between the plurality of luminaires and the controller, and information regarding one or more ports of each of the plurality of interface;

displaying, by the controller on the display, grouping selection information, the grouping selection information including at least one of a first option for grouping, into a group, one or more sets of luminaires connected respectively to one or more interfaces among the plurality of interfaces and a second option for grouping, into a group, one or more sets of luminaires connected respectively to one or more ports among the ports;

receiving, by the controller, a selection of one of the first option or the second option;

displaying, by the controller on the display, a grouping operation screen for determining the grouping operation is performed and grouping the plurality of luminaires into groups, based on the received selection;

receiving, by the controller, the grouping operation; and displaying, by the controller on the display, a result of the grouping.

* * * * *